United States Patent
Korda (10) Patent No.: US 11,017,172 B2
(45) Date of Patent: May 25, 2021

(54) PROPOSITION IDENTIFICATION IN NATURAL LANGUAGE AND USAGE THEREOF FOR SEARCH AND RETRIEVAL

(71) Applicant: Nahum Korda, Ramat Ha-Golan (IL)

(72) Inventor: Nahum Korda, Ramat Ha-Golan (IL)

(73) Assignee: SIGNALS ANALYTICS LTD., Netanya (IL)

(*) Notice: Subject to any disclaimer, the term of this patent is extended or adjusted under 35 U.S.C. 154(b) by 156 days.

(21) Appl. No.: 16/051,531

(22) Filed: Aug. 1, 2018

(65) Prior Publication Data

US 2020/0042594 A1 Feb. 6, 2020

(51) Int. Cl.
G06F 16/2458 (2019.01)
G06F 9/451 (2018.01)
G06F 40/253 (2020.01)
G06F 40/137 (2020.01)
G06F 40/289 (2020.01)
G06F 16/9032 (2019.01)
G06F 40/30 (2020.01)
G06F 40/284 (2020.01)

(52) U.S. Cl.
CPC ...... *G06F 40/289* (2020.01); *G06F 16/90332* (2019.01); *G06F 40/284* (2020.01); *G06F 40/30* (2020.01)

(58) Field of Classification Search
CPC .... G06F 16/2465; G06F 9/454; G06F 40/253; G06F 40/137
USPC .......................................................... 704/8, 9
See application file for complete search history.

(56) References Cited

U.S. PATENT DOCUMENTS

| | | | |
|---|---|---|---|
| 4,864,502 A * | 9/1989 | Kucera | G06F 40/253 704/8 |
| 5,146,406 A | 9/1992 | Jensen | |
| 6,658,377 B1 | 12/2003 | Anward et al. | |
| 8,155,951 B2 | 4/2012 | Jamieson | |
| 8,321,410 B1 | 11/2012 | Bharat et al. | |
| 8,335,681 B2 | 12/2012 | Yin et al. | |
| 8,355,902 B1 | 1/2013 | Brants et al. | |
| 8,515,939 B2 | 8/2013 | Chen et al. | |
| 8,626,492 B1 | 1/2014 | Brants et al. | |
| 8,706,476 B2 * | 4/2014 | Daraselia | G06F 9/454 704/9 |
| 8,719,262 B1 | 5/2014 | Bharat et al. | |
| 9,176,949 B2 | 11/2015 | Bullock et al. | |

(Continued)

FOREIGN PATENT DOCUMENTS

| | | |
|---|---|---|
| CN | 107015969 | 8/2017 |
| EP | 1151401 | 11/2001 |
| JP | 4054035 | 2/2008 |

*Primary Examiner* — Farzad Kazeminezhad
(74) *Attorney, Agent, or Firm* — Naomi S. Rosenman-Helfand (57) ABSTRACT

A method for determining whether a text complies with a query, an apparatus and a computer program product, the method comprising: obtaining a macro comprising a plurality of representations of a query; and executing the macro against a database comprising a simplified representation of at least one phrase within the text, to determine 10 whether the text complies with any of the representations of the query. The simplified representation is presented in the form of: conferrer (carrier; bearer; substrate; descriptor) and provides information pertaining to who, what, when and how with respect to the text associated with the simplified representation.

17 Claims, 3 Drawing Sheets

(56) References Cited

U.S. PATENT DOCUMENTS

| | | |
|---|---|---|
| 9,740,771 B2 | 8/2017 | Byron et al. |
| 9,886,501 B2 | 2/2018 | Krishnamnrthy et al. |
| 9,910,848 B2 | 3/2018 | Beller et al. |
| 2007/0022105 A1* | 1/2007 | Roux .................... G06F 40/137 |
| 2020/0005153 A1* | 1/2020 | Ramanath ........... G06F 16/2465 |

* cited by examiner

PROPOSITION IDENTIFICATION IN NATURAL LANGUAGE AND USAGE THEREOF FOR SEARCH AND RETRIEVAL

TECHNICAL FIELD

The present disclosure relates to text analysis in general, and to proposition identification in natural language and usage thereof, in particular.

BACKGROUND

Artificial Intelligence (AI) techniques are being used in more and more areas of our lives, such as but not limited to character recognition, speech recognition, text analysis, content analysis, scene interpretation, medical diagnosis, logistics, clinical decision support, data mining and knowledge to name just a few.

In natural language understanding, the AI efforts sometimes miss the goal, since it is attempted to interpret whole documents, while all that is required is to identify whether a specific proposition, opinion or intention is expressed in a document.

One such scenario relates to information retrieval purposes, where the user may be interested in retrieving documents in which, for example, the price of a product X is discussed and is deemed inadequate. However, such proposition can be expressed in a plurality of phrasings, such as but definitely not limited to "X is expensive", "X is not cheap", "X is not worth its price", "X is overpriced", "there are cheaper alternatives to X", etc. Each phrasing can have multiple variants, thus it is practically impossible to cover all the options for retrieving the required documents.

Another scenario relates to classification of documents according to the statements, opinions or intentions expressed therein. For example, a computerized system may be required to distinguish between documents that claim that product X is expensive, the documents that claim that it is not, documents that make no claim regarding the price of X, and documents unrelated to X at all. If such classification is carried out on social media content, the size of each class could, for example, provide an estimate of the popularity of various opinions about the product X and its price.

BRIEF SUMMARY

One exemplary embodiment of the disclosed subject matter is a computer-implemented method for determining whether a text complies with a query, comprising: obtaining a macro comprising a plurality of representations of a query; and executing the macro against a database comprising a simplified representation of at least one phrase within the text, to determine whether the text complies with any of the representations of the query. The method can further comprise populating the database, comprising; receiving a plurality of texts; for each text from the plurality of texts and for each sentence within the text: converting the text into a dependency representation and constituency; identifying core components within the text using the dependency representation; mapping the core components into a conceptual model; extracting phrases from the constituency representation, wherein the core components are embedded within the phrases; mapping the phrases into the conceptual model to obtain simplified representations of the phrases; identifying modalities within the text and adding the modalities to the simplified representation; and storing components of the simplified representation in a database and indexing the database in accordance with the components for enabling searching therein. The method can further comprise: combining multiple simplified representations into a hierarchical structure; and identifying the modalities within the hierarchical structure using inference. The method can further comprise generating the macro upon a plurality of expressions, thereby providing natural language variances to be searched within the database. Within the method, said generating the macro optionally comprises: obtaining expressions related to a proposition of interest; converting the expressions into simplified representation; and formulating the macro based on the expressions. The method can further comprise retrieving the text subject to the text complying with the query. The method can further comprise obtaining classification information based on texts from a plurality of texts complying with the query. Within the method, the representation is optionally a dependency representation, the dependency representation comprising binary relations that describe syntactic relationship between two words in a sentence. Within the method, extracting the phrases comprises mapping the core components into a constituency representation of the sentence.

Another aspect of the disclosure relates to a computerized apparatus having a processor, the processor being configured to perform the steps of: obtaining a macro comprising a plurality of representations of a query; and executing by the processor the macro against a database comprising a simplified representation of at least one phrase within the text, to determine whether the text complies with any of the representations of the query. Within the apparatus, populating the database optionally comprises: receiving a plurality of texts; for each text from the plurality of texts and for each sentence within the text: converting the text into a dependency representation and constituency representation; identifying core components within the text using the dependency representation; mapping the core components into a conceptual model; extracting phrases from the constituency representation, wherein the core components are embedded within the phrases; mapping the phrases into the conceptual model to obtain simplified representations of the phrases; identifying modalities within the text and adding the modalities to the simplified representation; and storing components of the simplified representation in a database and indexing the database in accordance with the components for enabling searching therein. Within the apparatus, the processor is optionally further configured to: combine multiple simplified representations into a hierarchical structure; and identify the modalities within the hierarchical structure using inference. Within the apparatus, the processor is optionally further configured to generate the macro upon a plurality of expressions, thereby providing natural language variances to be searched within the database. Within the apparatus, said generating the macro optionally comprises: obtaining expressions related to a proposition of interest; converting the expressions into simplified representation; and formulating the macro based on the expressions. Within the apparatus, the processor is optionally further configured to retrieve the text subject to the text complying with the query. Within the apparatus, the processor is optionally further configured to obtain classification information based on texts from a plurality of texts complying with the query. Within the apparatus, the representation is optionally a dependency representation, the dependency representation comprising binary relations that describe syntactic relationship between two words in a sentence. Within the apparatus, extracting the phrases optionally comprises mapping the core components into a constituency representation of the sentence.

Yet another aspect of the disclosure relates to a computer program product comprising a non-transitory computer readable storage medium retaining program instructions configured to cause a processor to perform actions, which program instructions implement: obtaining a macro comprising a plurality of representations of a query; and executing the macro against a database comprising a simplified representation of at least one phrase within the text, to determine whether the text complies with any of the representations of the query. Within the computer program product, the program instructions optionally further implement populating the database, comprising; receiving a plurality of texts; for each text from the plurality of texts and for each sentence within the text: converting the text into a dependency representation and constituency representation; identifying core components within the text using the dependency representation; mapping the core components into a conceptual model; extracting phrases from the constituency representation, wherein the core components are embedded within the phrases; mapping the phrases into the conceptual model to obtain simplified representations of the phrases; identifying modalities within the text and adding the modalities to the simplified representation; and storing components of the simplified representation in a database and indexing the database in accordance with the components for enabling searching therein.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is the need to determine semantic equivalence, in order to determine whether a document comprises a required proposition. Such determination can be used by various applications, such as classification, document retrieval, or others.

One known technique for determining semantic equivalence comprises transforming a natural language utterance into a canonical form, which may be referred to as the proposition. The canonical form may be viewed as a representation of the intension of an utterance. Propositions can then serve as the uniform substrate on which applications such as retrieval or classification could be performed. In the example above, the proposition "the price of X is inadequate" expresses the intention of, and can replace each of the statements "X is expensive", "X is not cheap", "X is not worth its price", "X is overpriced", "there are cheaper alternatives to X". This proposition can then allow a computerized system to identify the corresponding documents as relevant, or to classify them correctly.

However, in order to use this technique, the entirety of each of a plurality of documents has to be reduced to a plurality of propositions, since it is unknown in advance which propositions will be used as queries or classification criteria. This is a practically impossible task, since it must be executed on an indefinite variety of natural language expressions. On the other hand, employing this technique requires a tremendous amount of redundant processing, since only very few specific cases will eventually be of actual interest, and thus most of each text will be unnecessarily processed by a high resource consuming process.

Some prior art solutions focus on semantic analysis of the text. Such solutions may use the methods of semantic role labeling (SRL) or triples.

SRL assigns labels to words or phrases that indicate their semantic role in the sentence, such as that of an agent, a goal, or a result, as detailed for example in "*Automatic Labeling of Semantic Roles*", by Gildea et al., published In *Proceedings of the 38th Annual Conference of the Association for Computational Linguistics (ACL*-00), pp. 512-520, Hong Kong, October 2000.

An example of SLR relates to analyzing the sentence: "The group agreed it wouldn't make an offer." The labels contain a first argument, referred to as Arg0 that labels the agreer, which is the group, while a second argument referred to as Arg1 labels the proposition the agreement is about, which is not making an offer. It is appreciated that the semantic roles of the arguments, being agreer and agreement, are specific to the verb "agree".

In another example, it is required to analyze the sentence: "Oil rose in price in 2%". A first item is Oil, an attribute is "in price" and a difference is "by 2%". While labels are generic and can be shared between verbs, still every verb has a specific set of labels allowed to be associated with it.

Thus, a semantic role label is significantly more complex than a syntactic element, since a single syntactic element (e.g., a subject) can assume numerous semantic roles (e.g., agent, experiencer, recipient, beneficiary, etc.). Such complexity may make the development of generic, canonical semantic role models cumbersome, thus hindering the practical application of SRL.

Semantic roles may be defined in so-called frames. For every word sense of a verb, a frame needs to be developed that defines which semantic roles the specific word sense can assume, as shown in the example below. Multiple verbs can share the same framework, if the corresponding word senses are synonymous, for example: "send", "forward" and "mail". On the other hand, a single verb can have multiple frames, one frame for each distinct word sense, for example: the verb "drive" may have multiple frames, a first for "drive a car", a second for "drive enemy off the battlefield", a third for "drive a nail into the plank", etc.

Table 1 below shows some core labels and their definitions, while Table 2 below shows some non-core labels and definitions. Core roles are frame specific, while non-core roles are general properties. Related for example to time, location, or the like.

TABLE 1

Core Roles

| | |
|---|---|
| ATTRIBUTE | The ATTRIBUTE is a scalar property that the ITEM possesses. |
| DIFFERENCE | The distance by which an ITEM changes its position on the scale. |
| FINAL STATE | A description that presents the ITEM's state after the change in the ATTRIBUTE's value as an independent predication. |
| FINAL VALUE | The position on the scale where the ITEM ends up. |
| INITIAL STATE | A description that presents the ITEM's state before the change in the ATTRIBUTE's value as an independent predication. |
| INITIAL VALUE | The initial position on the scale from which the ITEM moves away. |
| ITEM | The entity that has a position on the scale. |
| VALUE RANGE | A portion of the scale, typically identified by its end points, along which the values of the ATTRIBUTE fluctuate. |

TABLE 2

Non-Core Roles

| | |
|---|---|
| DURATION | The length of time over which the change takes place. |
| SPEED | The rate of change of the VALUE. |
| GROUP | The GROUP in which an ITEM changes the value of an ATTRIBUTE in a specified way. |

SRL provides a uniform substrate upon which text mining applications, such as retrieval and classification can be performed. A sentence labeled with semantic roles can theoretically be viewed as a proposition, or a proposition could be derived from the labels. However, the vast potential diversity of the semantic roles, even when fairly generic, may make the semantic roles almost as convoluted as the original natural language expressions, and thus makes the machine interpretation of an SRL-labeled sentence almost as complex as the interpretation of the original natural language sentence, even for generic semantic labels. Moreover, SRL may add further implementation complexity by requiring extensive frame databases. For the system to be practical it should be capable of assigning the intensional representation to every intelligible natural language utterance. The amount of SRL frames required to accomplish this is huge, and the effort required for such endeavor is impractical even when restricted to a specific domain.

An alternative approach to the SRL is the extraction of Triples, also referred to as Description Logic Triples, was adopted by the Resource Description Framework (RDF), which is an official W3 standard. Triples are binary relations binding two entities, or an entity and a value. Thus, a triple consists of three elements: entity 1, entity 2, and relation; or entity, value and relation. For example, the following XML lines:

```
<rdf:Description rdf:about="http://www.example.org/index.html">
    <exterms:creation-date>August 16, 1999</exterms:creation-date>
</rdf:Description>
``` can be decomposed into constituents, and represented as a triple of subject-predicate-object/value triple, as shown in Table 3 below:

TABLE 3

| Subject | Predicate | Object/Value |
|---|---|---|
| http://www.example.org/index.html | exterms:creation-date | Aug. 16, 1999 |

Automatic extraction of triples from natural language text may seem an attractive option, since it minimizes the effort of the manual construction of the RDF knowledge bases. For this task, the structural sentence analysis provided by the NLP software becomes highly useful, since it enables extraction of triples not only from simple subject-predicate-object sentences, but also from nested clauses and complex syntactic constructs. However, a problem with using triples for modelling natural language is that they can model only relations, and moreover, only binary relations. For example, an attempt to use triples to model a sentence such as: "Coffee brand X gives me a morning kick" is unsuccessful, since the interaction between "coffee brand X" and the person in that sentence is not relational, and there are three components involved in this interaction: coffee, a person and "the morning kick". thus, a more complex representational model is necessary.

Thus, neither SLR nor triples provide a satisfactory solution for semantic text analysis for purposes such as retrieval and classification scenarios described above. However, logical proposition extraction from natural language provides an advantage in such scenarios. Propositions are sufficiently simple for machine handling, and the complex lexical resources are not required during preparation of the texts to be searched.

Thus, one technical solution of the disclosed subject matter relates to identifying propositions in natural language for applications such as searching or classifying. In contrast to known solutions, the present disclosure relates to executing queries against a database of documents, wherein each document, also referred to as text, is reduced to simplified representations of phrases. Each query may comprise a plurality of statements related to a proposition to be searched for, and by executing the query it may be determined whether the one or more texts within the database comply with the proposition.

Proposition extraction is focused primarily on structural analysis of the text, and may use two sentence representation strategies: constituency representation and dependency representation. The constituency representation represents a sentence as a tree consisting of phrases (such as verb phrase, noun phrase, prepositional phrase, etc.), which in turn consists of words. The dependency representation, on the other hand, views a sentence as a collection of relations between single words (predicate-subject, predicate-object, predicate-preposition, etc.), and consists of binary relations that describe syntactic relationship between two words in a sentence. One of the words in this relation is considered to be the one that determines the relation, and is typically referred to as the governor, while the other word is considered to be its dependent. The set of all possible syntactic relations is limited and predefined. Even if labeled differently by different NLP platforms, these relations are similar, and may be drawn from the standard grammar theory.

Thus, the sentence "The quick brown fox jumped over the lazy dog" may be represented in the constituency representation as follows:

```
(ROOT
  (S
    (NP (DT The) (JJ quick) (JJ brown) (NN fox))
    (VP (VBD jumped)
      (PP (IN over)
        (NP (DT the) (JJ lazy) (NN dog))))
    (. .)))
``` wherein "S" stands for "sentence", "NP" for "noun phrase", "VP" for verb phrase, and "PP" for "prepositional phrase". It will be appreciated that the following abbreviations refer to speech tags rather than phrase tags: JJ is an adjective, NN is a singular noun, VBD is a participle form of a verb, DT is a determiner, and IN is preposition.

The dependency representation of the same sentence may be as follows:

| | | |
|---|---|---|
| root | ROOT-0 | jumped-5 |
| nsubj | jumped-5 | fox-4 |
| prep_over | jumped-5 | dog-9 |
| det | fox-4 | The-1 |
| amod | fox-4 | quick-2 |
| amod | fox-4 | brown-3 |
| det | dog-9 | the-7 |
| amod | dog-9 | lazy-8 | wherein the predicate serves as the root, "nusbj" stands for "nominal subject", "prep_over" is a shorthand that binds the object to the predicate via the preposition, "dobj" is direct object, "amod" is adjectival modifier, and "det" is determiner.

The syntactic representations, i.e. the dependency representation and the constituency representation may then be used in generating the conceptual model to create that simplified representation. While the dependency representation is mapped into the model, the constituency representation provides the phrases from the original documents.

Thus, the database generation comprises the reduction of the texts to simplified form, which may be done regardless of whether and which queries will be executed upon the database.

The determination of the relevancy of documents in the database may be performed in runtime, "on the fly", once one or more propositions to be searched for are known, and once statements defined as describing each proposition have been defined.

The disclosure thus provides a method for the identification of propositions in natural language. The natural language text is first processed using NLP. Processing may employ extracting the dependency representation of a sentence, in order to detect its core components. Then the constituency representation may be applied, in order to extract these components as complete phrases. Based on the syntactic structure of the sentence, and the role that the components play in it, the components are then inserted into a conceptual model, in order to generate a simplified representation of the sentence. A conceptual model may have the following features:

1. The representation of a sentence is viewed as an operator function (referred to as the "conferrer", since it confers the meaning) that receives a number of arguments. Compared to the triples, the notion of the operator function may extend the concept of relation to include also actions, assignments of a property, identities, speech acts, or any other intelligible utterance that operates on arguments to produce meaning.

2. The arguments may be labeled with semantic roles that define their relation to the conferrer. Compared to the SRL, the semantic roles are generic rather than word sense specific. Additionally, there are fewer semantic roles than in SLR, and the semantic roles are fixed for all conferrers:

A Carrier is an argument that answers the question "who" or "what" is the performer of an action, the owner of a property or a component of identity is intended.

A Bearer is the argument that answers the question "who" or "what" if the receiver of an action is intended.

A substrate is the argument that answers the question "when" or "where".

A descriptor is the argument that answers the question "how".

3. A conferrer can take multiple arguments of the same semantic role. Compared to the triples, the operator functions are not binary, but n-ary with an indefinite number of arguments.

4. Complex sentences may be broken down into multiple individual representations.

A simplified sentence representation may take the following form: conferrer(carrier; bearer; substrate; descriptor), wherein the arguments, i.e. "carrier", "bearer", "substrate", and "descriptor" may be listed in this order, and delimited by a delimiter, such as a semicolon. An empty space or no character may be inserted if a specific argument is missing. For example, the sentence where the conferrer is "make", the carrier is "product X", the bearer is "skin", the descriptor is "radiant" and the substrate is missing can be represented by the following ternary operator function: make(product X; skin; ; radiant). Multiple arguments with the same semantic role may be separated using a predetermined character, such as a comma. For example: give(brother; I, good advice; ;) represents the sentence "My brother gave me a good advice." This sentence features two bearers: "I" and "good advice".

The extracted representations may be stored in a database, which can be searched in accordance with queries. A query or a classification criterion may be formulated as a proposition of interest, wherein it is required to identify in the natural language documents. Instead of operating on the original text, searching may be performed upon the stored simplified representations.

In order to search for a proposition, the proposition may be mapped into a database of lexical, phrasal and propositional expressions. The expressions depict the different ways in which the proposition of interest can be formulated in natural language.

For example, the proposition "product X makes my skin radiant" may be satisfied by each of the following natural language sentences, and additional ones:

"X gave my skin a shiny look."
"Cream X makes skin look radiant."
"My skin was given a vibrant look by X."
"X left my skin glow."
"X made my skin feel shimmery."

The sentences listed above can be formally represented using the same conceptual model applied to the representations as stored in the database, as shown in Table 4 below:

TABLE 4

| Natural Language Sentence | Formal Representation |
|---|---|
| X gave my skin a shiny look. | give(X; skin, shiny look; ; ;) |
| Cream X makes skin look radiant. | make look(X; skin; ; radiant;) |

TABLE 4-continued

| Natural Language Sentence | Formal Representation |
|---|---|
| My skin was given a vibrant look by X. | give(X; skin, vibrant look; ; ;) |
| X left my skin glow. | leave glow(X; skin; ; ;) |
| X made my skin feel shimmery. | make feel(X; skin; ; shimmery;) |

In runtime, the operator specified in the query/criterion can then be compared to the operators in the database, and the arguments can then be compared to the arguments in the database, but only within the specified semantic role (i.e. carriers are compared to carriers, bearers to bearers, etc.).

The complete matches may then indicate that the proposition of interest was identified within in the natural language phrase whose representation is stored in the database, and determined to be in compliance with the query. The corresponding document may then be retrieved from the database, classified into a designated category, or the like, depending on the application.

It will be appreciated that the database of lexical, phrasal and propositional expressions used to identify the query/criterion proposition in natural language is typically significantly smaller than SRL databases, for example in a few orders of magnitude. In contrast to SRL databases that are designed to label any intelligible natural language utterance, a database in accordance with the disclosure may contain only data relevant to the specific propositions of interest, which can be developed with a reasonable effort in a short period of time.

One technical effect of the disclosure thus relates to avoiding the complete transformation of a full document into propositions, but only the relevant parts. Further, a solution in accordance with the disclosure is not required to carry out the transformation into propositions in advance, but only in runtime.

Another technical effect of the disclosure relates to the database being useful for executing a plurality of queries related to any subject or vertical. A database may thus be prepared once, and used by a plurality of clients from different areas of interest, for different products, markets, or the like. Moreover, the definition of phrases for each required proposition may thus be performed by an expert in the specific field it is required to explore in the documents, rather than by a programmer or a database supplier lacking the specific expertise.

Figure 1:
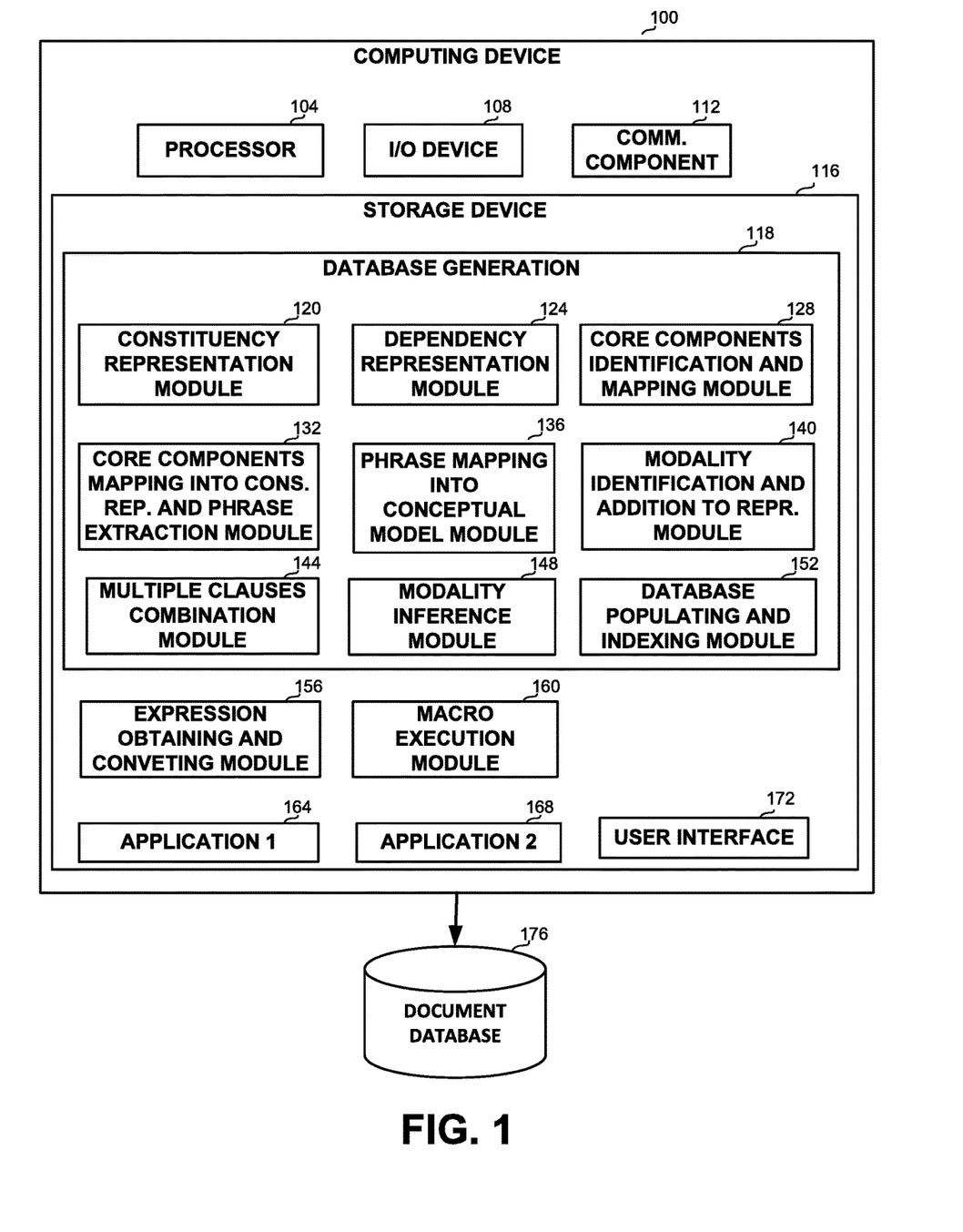
FIG. 1 is a block diagram of an apparatus for proposition identification and usage thereof, in accordance with some embodiments of the disclosure.

Referring now to FIG. 1, showing a block diagram of an apparatus for proposition identification, in accordance with some embodiments of the disclosure.

The apparatus may comprise computing device 100. It will be appreciated that computing device 100 can comprise one or more computing devices, which may be co-located or located in different sites and communicating therebetween. Computing device 100 may comprise one or more processors 104. Any of processors 104 may be a Central Processing Unit (CPU), a microprocessor, an electronic circuit, an Integrated Circuit (IC) or the like. Alternatively, computing device 100 can be implemented as one or more firmwares written for or ported to a specific processor such as digital signal processor (DSP) or microcontrollers, or can be implemented as hardware or configurable hardware such as field programmable gate array (FPGA) or application specific integrated circuit (ASIC). Processors 104 may be utilized to perform computations required by computing device 100 or any of it subcomponents.

In some embodiments, computing device 100 may comprise an input-output (I/O) device 108 such as a terminal, a display, a keyboard, a mouse, a touch screen, or the like to interact with the system, for example to invoke the system or to receive results. It will however be appreciated that the system can operate without human operation and without I/O device 108.

In some embodiments, computing device 100 may comprise one or more communication components 112, for communicating with other computing platforms, databases, the Internet, or the like. Communication components 112 can be used for interfacing any communication channel using any communication protocol.

Computing device 100 may comprise one or more storage devices 116 for storing executable components, and which may also contain data during execution of one or more components. Storage device 116 may be persistent or volatile. For example, storage device 116 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 116 may retain data structures and program code operative to cause any of processors 104 to perform acts associated with any of the steps shown in FIG. 2 below.

Storage device 116 can comprise or be operatively connected to one or more document databases 176, storing raw documents, simplified representations of documents that can be queried, queries, ontologies, proposition definitions, or the like.

The components detailed below may be implemented as one or more sets of interrelated computer instructions, executed for example by any of processors 104 or by another processor. The components may be arranged as one or more executable files, dynamic libraries, static libraries, methods, functions, services, or the like, programmed in any programming language and under any computing environment.

In some exemplary embodiments of the disclosed subject matter, storage device 116 may comprise a database generation 118 collection of modules, and additional modules for obtaining insights from the database in accordance with propositions.

Database generation components 118 may comprise constituency representation module 120; dependency representation module 124; core components identification mapping module 128; core components mapping into constituent representation and phrase extraction module 132; phrase mapping into conceptual model 136; modality identification and addition representation module 140; multiple clause combination module 144; modality inference module 148; and database population and indexing module 152.

The additional modules may include expression obtaining module 156; macro execution module 160; and one or more applications, such as application 1 (164); application 2 (168) or others. Storage device 116 may also comprise user interface 172 for receiving input from a user, for example a proposition and associated expressions, providing output to the user, for example displaying retrieved documents, classification results, or the like. The input and output may be obtained through or displayed on any one or more of I/O devices 108.

Figure 2:
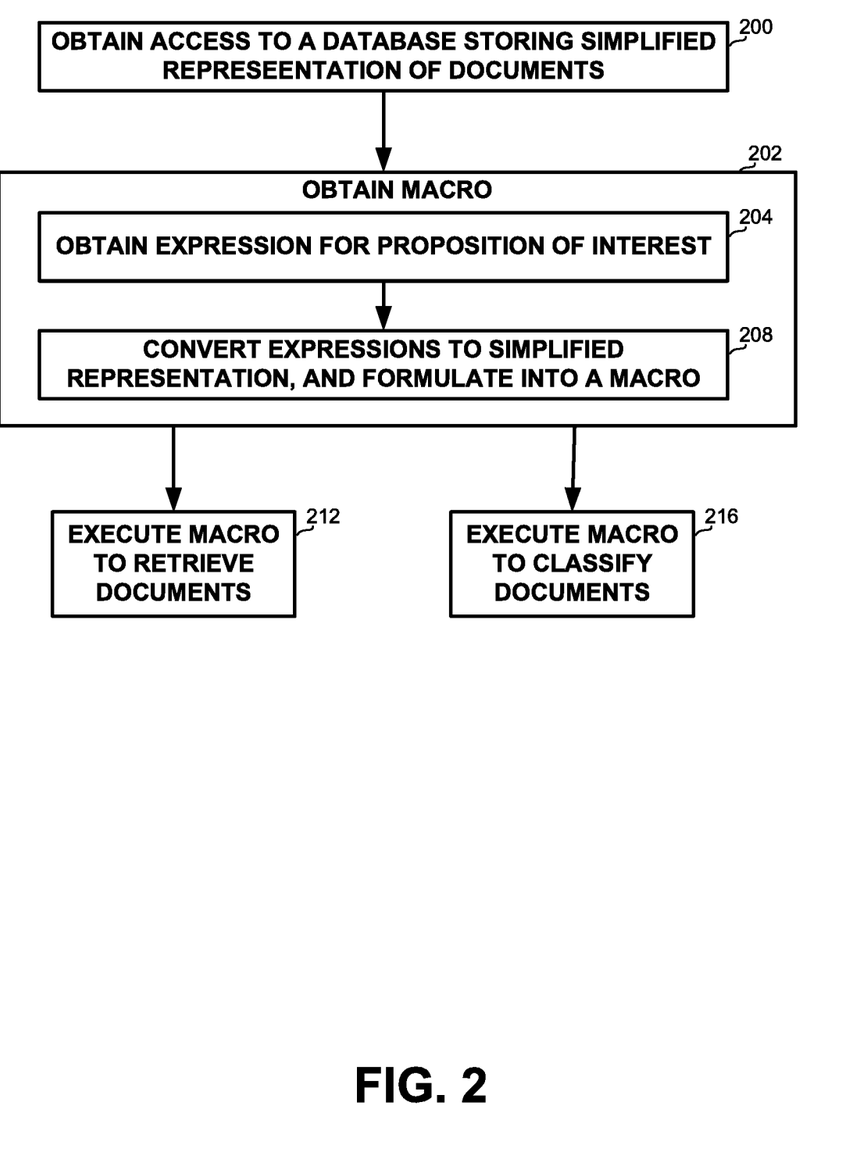
FIG. 2 is a flowchart of a method for proposition identification and usage thereof, in accordance with some embodiments of the disclosure.

Referring now to FIG. 2, showing a flowchart of a method for proposition identification, in accordance with some embodiments of the disclosure.

On step 200, a database of documents in a simplified searchable representation may be obtained for searching. Alternatively, access to such database may be obtained. Step 200 is further detailed in association with FIG. 3 below, showing a flowchart of a method for generating a searchable database of simplified representations of documents, in accordance with some embodiments of the disclosure.

Figure 3:
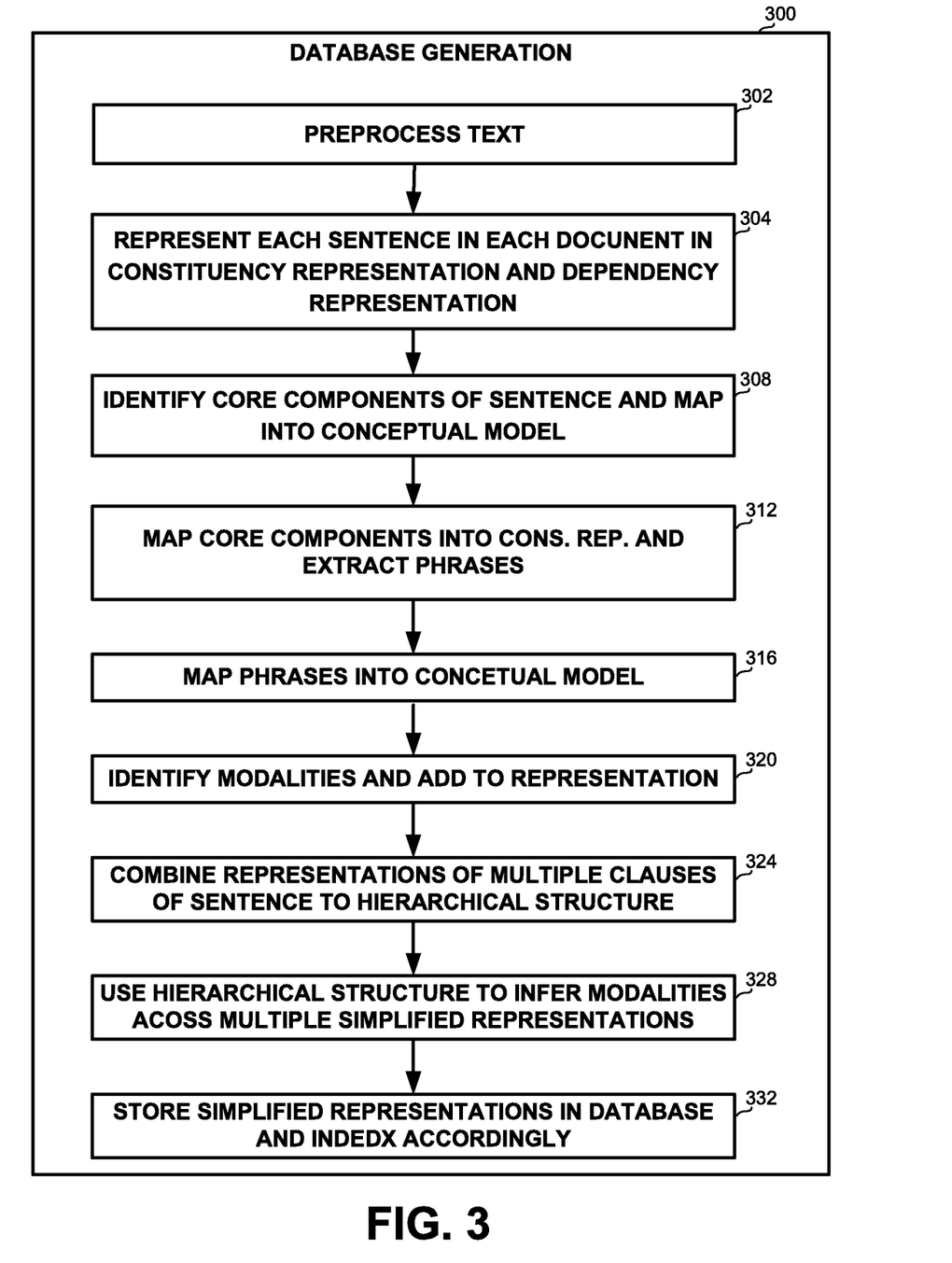
FIG. 3 is a flowchart of a method for generating a searchable database of simplified representations of documents, in accordance with some embodiments of the disclosure.

Referring now also to FIG. 3, on database generation 300, a database of document representation may be generated, wherein each document which may be provided in natural language, is converted into a simplified representation, and is stored in the database.

Database generation 300 may be performed anytime, for example before it is required to retrieve or classify documents in accordance with a given proposition.

The steps of database generation 300, detailed below, may be performed for each text document from a given collection of text documents.

On step 302, preprocessing can be performed over the text. Preprocessing can include but is not limited to any one or more activities from the following: Unicode standardization, for example in order to convert the text to Latin alphabets; removing characters other than letters, digits, symbols, or punctuation; removing non-textual elements, such as emoticons, quotation marks, parentheses or others; standardizing punctuation; converting capital and lower cases to standard English orthography; converting title case to standard English orthography; correcting frequent spelling mistakes; correcting one or more abbreviations; correcting social media spelling conventions; correcting spelling intended to reflect intonation; correcting outdated spelling; converting commonwealth spelling to US spelling; removing unnecessary hyphens; removing unnecessary slashes; simplifying colloquial phrases; converting complicated phrases into simpler alternatives; converting word sequences into compound words; correcting constructs that require insertion of a comma; explicating implied negations; removing interjections; removing social media phraseology; removing conversational phraseology; removing unnecessary phrase decorations; removing unnecessary emphasis using the auxiliary verb "do" or others, or the like On step 304, NLP processor may receive a text document, and may represent each sentence therein in constituency representation and in dependency representation. The representation may be performed, for example, by constituency representation module 120 and dependency representation module 124, respectively.

On step 308, the original sentence may be processed to identify the core components of the sentence, and map them into a conceptual model. The identification and mapping may be performed, for example, by core components identification and mapping module 128.

Table 4 below shows an example of the core components in the sentence "This cream makes my face non-greasy and smooth", and the corresponding mapping.

TABLE 4

| Relation | Components | Mapping |
| --- | --- | --- |
| nsubj | governor: makes | governor ↦ conferrer |
| (nominal subject) | dependent: cream | dependent ↦ carrier |
| dobj | governor: makes | governor ↦ conferrer |
| (direct object) | dependent: face | dependent ↦ bearer |
| amod | governor: face | governor ↦ bearer |
| (adjectival modifier) | dependent: non-greasy | dependent ↦ descriptor |

TABLE 4-continued

| Relation | Components | Mapping |
| --- | --- | --- |
| amod | governor: face | governor ↦ bearer |
| (adjectival modifier) | dependent: smooth | dependent ↦ descriptor |

Table 5 below shows an example of the core components in the sentence "This cream helped my skin feel smooth", in which a composite conferrer is constructed from two words, wherein the dependencies of each component are further combined, in order to complete the representation.

TABLE 5

| Relation | Components | Mapping |
| --- | --- | --- |
| ccomp | governor: helped | governor ↦ conferrer |
| (clausal complement) | dependent: feel | dependent ↦ conferrer |
| nsubj | governor: helped | governor ↦ conferrer |
| (nominal subject) | dependent: cream | dependent ↦ carrier |
| nsubj | governor: feel | governor ↦ conferrer |
| (nominal subject) | dependent: skin | dependent ↦ bearer |
| acomp | governor: feel | governor ↦ bearer |
| (adverbial complement) | dependent: smooth | dependent ↦ descriptor |

Table 6 below shows an example of the core components and mapping thereof in the sentence "This snack is delicious and nutritious", in which the conferrer is an assignment of a property via a copula, which is a word used to link the subject of a sentence with a predicate, which is often an inflection of the verb "be", and wherein multiple conferrers are defined (via conjunction), leading to multiple representations of a single sentence, wherein each representation expresses a different intension. In this example the representations may be: "is delicious (this snack; ; ;)" and "is nutritious (this snack; ; ;)".

TABLE 6

| Relation | Components | Mapping |
| --- | --- | --- |
| cop | governor: delicious | governor ↦ conferrer |
| (copula) | dependent: is | dependent ↦ conferrer |
| nsubj | governor: delicious | governor ↦ conferrer |
| (nominal subject) | dependent: snack | dependent ↦ carrier |
| nsubj | governor: nutritious | governor ↦ conferrer |
| (nominal subject) | dependent: snack | dependent ↦ carrier |

On step 312, the identified core components of a sentence may be mapped into a constituency representation of the sentence, and the phrases in which these components are embedded may be extracted. Step 312 may be performed by core components mapping into cons. rep. and phrase extraction module 132.

Table 7 below shows an example of the core components and the phrases they appear in, for the sentence "This cream makes my face non-greasy and smooth.

TABLE 7

| Constituency representation | Core component | Phrase |
|---|---|---|
| (ROOT<br>  (S<br>    (NP (DT This) (NN cream))<br>    (VP (VBZ makes)<br>      (NP<br>        (NP (PRP$ my) (NN face))<br>        (ADJP (JJ non-greasy)<br>          (CC and)<br>          (JJ smooth))))<br>    (. .))) | carrier: cream<br>bearer: face | (NP (DT This) (NN cream))<br>(NP (PRP$ my) (NN face)) |

Table 8 below shows an example of the core components and the phrases they appear in, for the sentence "This cream helped my skin feel smooth".

TABLE 8

| Constituency representation | Core component | Phrase |
|---|---|---|
| (ROOT<br>  (S<br>    (NP (DT This) (NN cream))<br>    (VP (VBD helped)<br>      (S<br>        (NP (PRP$ my) (NN skin))<br>        (VP (VB feel)<br>          (ADJP (JJ smooth)))))<br>    (. !))) | bearer: skin | (NP (PRP$ my) (NN skin)) |

Table 9 below shows an example of the core components and the phrases they appear in, for the sentence "This snack is delicious and nutritious".

TABLE 9

| Constituency representation | Core component | Phrase |
|---|---|---|
| (ROOT<br>  (S<br>    (NP (DT This) (NN snack))<br>    (VP (VBZ is)<br>      (ADJP (JJ delicious)<br>        (CC and)<br>        (JJ nutritious)))<br>    (. .))) | carrier: snack | (NP (DT This) (NN snack)) |

On step 316, the extracted phrases may be mapped into the conceptual model, in order to generate simplified representations of the original sentence. The conceptual model is made up as follows: conferrer+ arguments, wherein the arguments are a carrier, a bearer, a substrate, and a descriptor. If no value is available for one or more arguments, it may be interpreted as a missing value rather than a missing argument, and a space may be provided as a placeholder. Following the dependency representation, the core components may be mapped into various constituents of the conceptual model. The core concepts may then be replaced by the complete phrases using the constituency representation. Step 316 may be performed, for example, by phrase mapping into conceptual model module 136.

Table 10 below shows the simplified representations of the original sentences above.

TABLE 10

| Original sentence | Simplified representation (conceptual model) |
|---|---|
| "This cream makes my face non-greasy and smooth." | makes (This cream; my face; ; non-greasy;)<br>makes (This cream; my face; ; smooth;) |
| "This cream helped my skin feel smooth!" | helped feel (This cream; my skin; ; smooth) |
| "This snack is delicious and nutritious." | is delicious (This snack; ; ;)<br>is nutritious (This snack; ; ;) |

The constituents of the phrases may be preserved as tokens containing any one or more of the following information, but not limited thereto:
1. The original string extracted from the text,
2. The original string in lower case, 3. Part of speech (word class including grammatical form),
4. Generic part of speech (only word class),
5. Lemma (the canonical word from).

On step 320, modalities, such as negation (not, hardly, etc.), conditional mood, interrogative form, etc. may be identified and added to the simplified representation of the sentence. For example, in the sentence: "If Jon were here right now, he would help us", Jon is not here, and the proposition "be (Jon; ; here ;)" would be untrue. Such simplified representation may be flagged as conditional, for example "~ be (Jon; ; here;)", where the symbol "~" indicates that the mood is conditional and not declarative, thus making the representation true. Step 320 may be performed, for example, by modality identification and addition to representation module 140.

Table 11 below shows an example of negation, indicated by an exclamation mark preceding the conferrer.

TABLE 11

| Original sentence | Dependencies | | | Simplified representation |
| --- | --- | --- | --- | --- |
| | Relation | Governor | Dependent | |
| "This coffee is not strong." | nsubj | strong | coffee | ! is strong (This coffee; ; ; ;) |
| | cop | strong | is | |
| | neg | strong | not | |

It will be appreciated that modalities can also derived from the part of speech, word order in the sentence, use of the auxiliary verbs, or the like.

On step 324, if multiple clauses exist in a sentence, the simplified representations thereof may be combined into a hierarchical structure, in order to express relations between clauses. The multiple clause combination may be performed by multiple clause combination module 144.

Table 12 below presents an example of two clauses in a causal relationship. The causal relationship is established via the relation called the adverbial clause modifier ("advcl") between "like" and "makes", which are both identified as conferrers in the corresponding clauses.

TABLE 12

| Original sentence | Dependencies | | | Simplified representation |
| --- | --- | --- | --- | --- |
| | Relation | Governor | Dependent | |
| "I like this cream because it makes my skin soft." | nsubj | like | I | like (I; this cream; ; ;) |
| | dobj | like | cream | CAUSE: |
| | nsubj | makes | it | makes soft (it; my skin; ; ;) |
| | nsubj | soft | skin | |
| | xcomp | makes | soft | |
| | advcl | like | makes | |

On step 328, the hierarchical structures may be used to infer modalities across multiple simplified representations, for example by modality inference module 148. Machine inference, also referred to as machine reasoning attempts to represent data such that a machine, which does not "understand" what the data is about, can draw correct logical conclusions. A typical example is the inference by subsumption: if B is a subclass of A, and x is an element of B, then x is also an element of A (formally: $\forall x \, (A \supseteq B \lor x \in B \Rightarrow x \in A)$). Table 13 below shows the negation of the dependent clause inferred from the main clause, wherein an inferred negation is indicated by an asterisk preceding the conferrer, since the relation between them is that of the indirect discourse.

TABLE 13

| Original sentence | Simplified representation |
| --- | --- |
| "I wouldn't say that this is a good product." | !~say (I; ; ; ;)<br>INDIRECT DISCOURSE<br>* is a good product (this; ; ; ;) |

On step 332, resulting simplified representations may be stored in a database such as document database 176. Database 176 may be indexed in accordance with components of the simplified representations such that querying is enabled for each argument separately. For example, a query can be applied only to the conferrer, or only to the descriptor. Properties of the tokens, e.g., the original string, lower case string, part of speech, generic part of speech, lemma, or others may be indexed separately, so that each property can be queried separately. Storing and indexing the database step 332 may be performed by database populating and indexing module 152.

Once the database is generated and populated, queries may be executed to identify specific documents, for retrieval, classification or other purposes.

Referring now back to FIG. 2, once the database or access thereto has been obtained.

On step 202, one or more macros, being formalized natural language expressions designed to unambiguously identify a proposition of interest may be obtained. In some embodiments, the macro may be obtained from a storage device, from a user, or the like. In some embodiments, the macro may be created as detailed below. Step 202 may be performed by expression obtaining and converting module 156.

On step 204, a collection of lexical, phrasal or propositional expressions may be obtained for propositions of interest, i.e., propositions to be searched for in the underlying document corpus. The expressions may be synonym words, phrases having similar meaning, variations, or the like. An example of such propositions of interest are consumer opinions that are to be searched for in a corpus of product reviews received from the Internet. The expressions may be obtained from a user using a dedicated user interface, from automated tools using dictionaries, or the like. Table 4 above is an example to a proposition and the associated expressions.

On step 208, the expressions may be converted to the simplified representations, and formulated in a manner that enables matching. The formulation that enables such matching may be referred to as a macro. A macro is a formalized natural language expression designed to unambiguously identify a proposition of interest. Therefore, every macro represents a single proposition, while a single proposition can be represented by multiple macros. For example, the proposition expressing that a product is affordable can be represented by a multitude of macros, each representing one way how this proposition can be formulated in the natural language, for example "the price of the product is adequate", "the price is fair", "the product is fairly priced", or the like. A macro may consist of one or more modality symbols, one or more match rules and zero or more rejecting conditions. A match rule consists of one argument type and one or more elements; argument types correspond to the constituents of the simplified representation, e.g., conferrer, carrier, bearer, etc.; an element consists of one match method and one term; match methods correspond to the properties of a token e.g., original string, lower case string, part of speech; a term is a string; and a rejecting condition consist of one or more match rules. It will be appreciated that no modalities is the default selection that would identify representations both with and without modalities. For example, if the macro is "be (;;;good)", both forms "be (X;;;good)" and its negative "! be (X;;;good)" would be identified. However, the macro "! be (;;;good)" would identify only "! be (X;;;good)", and the macro "!!be (;;;good)" would identify only "be (X;;; good)".

Table 14 below provides a description of macros in the Backus-Naur Form (BNF):

TABLE 14

| | |
|---|---|
| <term> | ::= terminal symbols (any string) |
| <match method> | ::= EXACT \| CAIN \| POS_EXACT \| POS \| LEMMA |
| <element> | ::= [ "(" <match method> ")" ] <term> |
| <argument type> | ::= ANY \| CONFERRER \| CARRIER \| NONCORE \| BEARER \| DESCRIPTOR \| SUBSTRAT |
| <match rule> | ::= ["{" <argument type> "}"] <element> [" " <element>] |
| <match rules> | ::= <match rule> [ ";" <match rule> ] |
| <rejecting condition> | ::= <match rule> [ ";" <match rule> ] |
| <rejecting conditions> | ::= <rejecting condition> ["/" <rejecting condition>] |
| <modality symbol> | ::= "!" \| "!!" \| "*" \| "**" \| "?" \| "??" \| "~" \| "~~" \| ">" \| ">>" |
| <macro> | ::= [<modality symbol>] <match rules> ["\" <rejecting conditions>] |

A match method can be any of the following, as shown in table 15:

TABLE 15

| | |
|---|---|
| EXACT | The original string must be matched exactly as it occurs in the text. For example: "US" is matched only by "US" (but not by "us"). |
| CAIN | The original string must be matched CAse INsensitive. For example: "The" is matched by "The" and "the". |
| POS_EXACT | The entire part of speech tag must be matched, including the grammatical form. For example: "VBD" (a verb in participle) is matched only by "VBD". |
| POS | The generic word class must be matched. For example: "VBD" is matched by "VB" (any verb regardless of tense, number, gender, etc.). |
| LEMMA | Lemma must be matched. For example: "are" is matched by "be" (since "be" is the lemma of "are"). |

Table 16 below shows the definitions of possible argument types:

TABLE 16

| | |
|---|---|
| CONFERRER | Only terms occurring in the conferrer are matched. |
| CARRIER | Only terms occurring in the carrier are matched. |
| BEARER | Only terms occurring in the bearer are matched. |
| SUBSTRAT | Only terms occurring in the substrate are matched. |
| DESCRIPTOR | Only terms occurring in the descriptor are matched. |
| NONCORE | Terms occurring in either bearer, or substrate, or descriptor are matched. |
| ANY | Terms are matched regardless of where they occur. |

Table 17 below shows the definitions of possible modality symbols:

TABLE 17

| | |
|---|---|
| "!" | The simplified representation must be negated to be matched. |
| "!!" | The simplified representation must NOT be negated to be matched. |
| "*" | The simplified representation must be either negated, or negated by inference to be matched. |
| "**" | The simplified representation must be neither negated, nor negated by inference to be matched. |
| "?" | The simplified representation must be interrogative to be matched. |
| "??" | The simplified representation must NOT be interrogative to be matched. |
| "~" | The simplified representation must be modal to be matched. |
| "~~" | The simplified representation must not be modal to be matched. |
| ">" | The simplified representation must be in the future tense to be matched. |
| ">>" | The simplified representation must NOT be in the future tense to be matched. |

The queries can then be executed against the database comprising a simplified representation of phrases within the text, to determine whether the text complies with any of the representations of the query, thus identifying complying documents. The specifics of the query execution may depend on the application. Queries may be executed by query execution module 160.

For example, on step 212, related to search and retrieval, applications, one or more macros are selected as the queries. Alternatively, a query can be formulated as a collection of keywords, followed by mapping the keywords into macros from a dictionary prepared in advance. The macros can then be executed run against the database indices, and matches can be retrieved. The retrieved matches may be the documents which completely match the macros. Alternatively or additionally, a relevance ranking metrics may be applied, and the retrieved matches may be ordered by their rank. In some embodiments, only documents having a rank exceeding a threshold may be retrieved.

In another example, on step 216, related to classification, all macros may be applied at once to an entire document collection. Documents may be classified by tagging them using the matched macros. Every tag may symbolize the proposition of interest that underlines the matched macro. For example, the tag "affordable" can symbolize a proposition expressing that a product is affordable.

It will be appreciated that further applications may be defined, and macros may be executed accordingly.

Macro execution module 160, which can be invoked, for example, by application 1 (164), which may relate, for example to document retrieval, application 2 (168), which may relate, for example to classification or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, Java, C-HE or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining whether a text complies with a query, comprising:
    populating a database with simplified representations of a plurality of phrases within a plurality of texts to be retrieved in response to complying with queries, comprising:
        receiving the plurality of texts;
        for each text from the plurality of texts and for each sentence within the text:
            converting the text into a dependency representation that describes each sentence within the text as a collection of binary syntactic relations between words, wherein one of the words is a predicate, and into a constituency representation comprising for each sentence a tree consisting of phrases, wherein each phrase consists of words;
            identifying core components within the text using the dependency representation;
            mapping the core components into a conceptual model;
            extracting phrases from the constituency representation, wherein the core components are embedded within the phrases;
            mapping the phrases into the conceptual model to obtain simplified representations of the phrases;
            identifying modalities within the text and adding the modalities to the simplified representation; and
            storing components of the simplified representation of the text in a database and indexing the database in accordance with the components for enabling searching therein,
        wherein the simplified representation is of the form: conferrer (carrier; bearer; substrate; descriptor), thereby transforming and storing relevant parts of the text and avoiding complete transformation of the text into propositions;
    Obtaining at least two representations of a query, thereby creating a macro of the form: conferrer (carrier; bearer; substrate; descriptor), wherein the query relates to any subject or vertical;
    executing the macro against the database to determine as indexed, to determine whether the simplified representation of each of a plurality of texts within the database complies with any of the at least two representations of the query; and
    retrieving each text from the plurality of texts subject to the simplified representation of the text complying with the query,
    thereby retrieving texts related to any subject or vertical.

2. The method of claim 1, further comprising generating the macro upon a plurality of expressions, thereby providing natural language variances to be searched within the database.

3. The method of claim 2 wherein said generating the macro comprises:
    obtaining expressions related to a proposition of interest;
    converting the expressions into simplified representation; and
    formulating the macro based on the expressions.

4. The method of claim 1, further comprising tagging the simplified representation of each of the plurality of texts within the database using the macro, thereby classifying the simplified representation of each of a plurality of texts.

5. The method of claim 1, further comprising:
    combining multiple simplified representations into a hierarchical structure; and
    identifying the modalities within the hierarchical structure using inference.

6. The method of claim 1, further comprising obtaining classification information based on texts from a plurality of texts complying with the query.

7. The method of claim 1, wherein extracting the phrases comprises mapping the core components into a constituency representation of the sentence.

8. A computerized apparatus having a processor, the processor being configured to perform the steps of:
    populating a database with simplified representations of a plurality of phrases within a plurality of texts to be retrieved in response to complying with the query, comprising:
    receiving the plurality of texts;
    for each text from the plurality of texts and for each sentence within the text:
        converting the text into a dependency representation that describes each sentence within the text as a collection of binary syntactic relations between words, wherein one of the words is a predicate, and into a constituency representation comprising for each sentence a tree consisting of phrases, wherein each phrase consists of words;
        identifying core components within the text using the dependency representation;
        mapping the core components into a conceptual model;
        extracting phrases from the constituency representation, wherein the core components are embedded within the phrases;
        mapping the phrases into the conceptual model to obtain simplified representations of the phrases;

identifying modalities within the text and adding the modalities to the simplified representation; and storing components of the simplified representation in a database and indexing the database in accordance with the components for enabling searching therein, wherein the simplified representation is of the form: conferrer (carrier; bearer; substrate; descriptor), thereby transforming and storing relevant parts of the text and avoiding complete transformation of the text into propositions;

obtaining at least two representations of query, thereby creating a macro a macro of the form: conferrer (carrier; bearer; substrate; descriptor), wherein the query relates to any subject or vertical;

executing by the processor the macro against the database as indexed, to determine whether the simplified representation of each of a plurality of texts within the database complies with any of the at least two representations of the query; and retrieving each text from the plurality of texts subject to the simplified representation of the text complying with the query.

9. The apparatus of claim 8, wherein the processor is further configured to generate the macro upon a plurality of expressions, thereby providing natural language variances to be searched within the database.

10. The apparatus of claim 9 wherein said generating the macro comprises:

obtaining expressions related to a proposition of interest;

converting the expressions into simplified representation; and formulating the macro based on the expressions.

11. The apparatus of claim 8, further comprising tagging the simplified representation of each of the plurality of texts within the database using the macro, thereby classifying the simplified representation of the plurality of texts.

12. The apparatus of claim 8, wherein the processor is further configured to:

combine multiple simplified representations into a hierarchical structure; and identify the modalities within the hierarchical structure using inference.

13. The apparatus of claim 8, wherein the processor is further configured to retrieve the text subject to the text complying with the query.

14. The apparatus of claim 8, wherein the processor is further configured to obtain classification information based on texts from a plurality of texts complying with the query.

15. The apparatus of claim 8, wherein extracting the phrases comprises mapping the core components into a constituency representation of the sentence.

16. A computer program product comprising a non-transitory computer readable storage medium retaining program instructions configured to cause a processor to perform actions, which program instructions implement:

populating a database with simplified representations of a plurality of phrases within a plurality of texts to be retrieved in response to complying with the query, comprising:

receiving the plurality of texts;

for each text from the plurality of texts and for each sentence within the text:

converting the text into a dependency representation that describes each sentence within the text as a collection of binary syntactic relations between words, wherein one of the words is a predicate, and into a constituency representation comprising for each sentence a tree consisting of phrases, wherein each phrase consists of words;

identifying core components within the text using the dependency representation;

mapping the core components into a conceptual model;

extracting phrases from the constituency representation, wherein the core components are embedded within the phrases;

mapping the phrases into the conceptual model to obtain simplified representations of the phrases;

identifying modalities within the text and adding the modalities to the simplified representation; and storing components of the simplified representation of the text in a database and indexing the database in accordance with the components for enabling searching therein, wherein the simplified representation is of the form: conferrer (carrier; bearer; substrate; descriptor), thereby transforming and storing relevant parts of the text and avoiding complete transformation of the text into propositions;

obtaining at least two representations of a query, thereby creating a macro of the form: conferrer (carrier; bearer; substrate; descriptor), wherein the query relates to any subject or vertical;

executing the macro against the database as indexed, to determine whether the simplified representation of each of a plurality of texts complies with any of the at least two representations of the query; and retrieving each text simplified representation of the subject to the text complying with the query.

17. The computer program product of claim 16, wherein the program instructions further implement tagging the simplified representation of each of the plurality of texts within the database using the macro, thereby classifying the simplified representation of each of the plurality of texts within the database thereby classifying the simplified representation of each of the plurality of texts.

* * * * *